United States Patent [19]

McAlister

[11] Patent Number: 4,503,808

[45] Date of Patent: Mar. 12, 1985

[54] ANIMAL HERD MANAGEMENT SYSTEM

[76] Inventor: George A. McAlister, 7922 Windmill Hill, San Antonio, Tex. 78229

[21] Appl. No.: 501,181

[22] Filed: Jun. 6, 1983

[51] Int. Cl.$^3$ .................... A01K 29/00

[52] U.S. Cl. .................... 119/1

[58] Field of Search .................... 119/1, 51 R; 128/738, 128/774, 775

[56] References Cited

U.S. PATENT DOCUMENTS

| | | | |
|---|---|---|---|
| 1,237,983 | 8/1917 | Werner | 128/738 X |
| 3,180,321 | 4/1965 | Aldinger | 119/51 R |
| 3,297,020 | 1/1967 | Mathiesen | 128/2 |
| 3,844,273 | 10/1974 | Polson | 128/2 R |
| 4,206,766 | 6/1980 | Bielka | 128/738 |
| 4,232,686 | 11/1980 | Kammlade, Jr. | 128/775 |
| 4,239,018 | 12/1980 | Griffin et al. | 119/1 |
| 4,247,758 | 1/1981 | Rodrian | 235/92 MS |
| 4,262,632 | 4/1981 | Hanton et al. | 119/1 |
| 4,411,274 | 10/1983 | Wright | 128/738 |

FOREIGN PATENT DOCUMENTS

| | | | |
|---|---|---|---|
| 1242385 | 8/1971 | United Kingdom | 119/51 R |
| 1577023 | 10/1980 | United Kingdom | 119/51 R |

OTHER PUBLICATIONS

"Model 708P Users Manual", Schlage Electronics, P-N 66103305 Revision E.

Model 708P Proximity Card Reader, Schlage Electronics, May, 1982.

Schlage Electronics Sensors, Schlage Electronics, Form 156.

D. J. Buckley and W. G. Hunsaker, "A Telemetry System for Automatically Recording Copulation in Sheep," *Medical and Biological Engineering*, Nov. 1974, pp. 837-842.

*Primary Examiner*—Robert P. Swiatek

*Attorney, Agent, or Firm*—Richards, Harris, Medlock & Andrews

[57] ABSTRACT

A system for detecting standing heat of an animal (12) is provided. A generator (18) is secured to the body of the animal (12) for generating an identification signal uniquely identifying the animal (12) and for generating a time of day signal. A sensor (20) is secured to the body of an animal (10) for receiving the signals generated by the generator (18) as the animal (10) mounts the animal (12) and for receiving the signals generated by the generator (18) as the animal (10) dismounts the animal (12). The sensor (20) further transmits the signals received from the generator (18). A processor (24, 28) receives the sensor (20) transmitted signals for determining the length of time the animal (10) was in mounting contact with the animal (12).

1 Claim, 4 Drawing Figures

ANIMAL HERD MANAGEMENT SYSTEM

TECHNICAL FIELD

This invention relates to animal herd management systems, and more particularly animal husbandry and a system for determining when an animal is in estrus or heat.

BACKGROUND ART

In the field of animal husbandry, mankind is continually seeking to improve livestock by the selective breeding thereof. Artificial insemination of livestock has become a common practice and is being used on an ever increasing scale for selective breeding and to take advantage of genetics available from many outstanding herd sires without the investment of owning these herd sires. Breeding by artificial insemination requires that the semen be administered while the female is in estrus. In more recent years, embryo transplants have been used to take advantage of desirable genetics in an outstanding female to increase many fold her produce, and to examine in a short span of time, i.e. one year, the transferable genetics of a herd sire to see if he breeds true, i.e. he reproduces a likeness of himself, vis-a-vis color, polled, height, etc.

Such embryo transplant programs require that all the recipient cattle that are to receive embryos on a certain day be in the same heat cycle as the donor cattle being collected on that day. Again, it is required to know the true estrous cycle of both the donor and the recipient cattle so that synchronization of the estrus cycle can be accomplished through the administering of drugs.

The most common approach in determining whether an animal is in heat has been visual observation by herdsmen, usually aided by a "teaser" or "gomer" bull or "teaser" female. These "teaser" or "gomer" bulls have been surgically altered so they cannot service a female, but they can detect estrus. "Teaser" females have been given male hormones to make them behave like a bull and to enhance their detection of estrus in normal females.

The visual signs that indicate heat cover a wide range. Under normal conditions, a cow in heat (estrus) will stand for a limited time, usually measured in seconds, and accept service by a bull or stand to be mounted by a "teaser" animal. In addition, in peak estrus a female will stand and permit herself to be ridden by other females, or she will attempt to ride other females not in estrus. Such females not in estrus will usually quickly "run out from under" the female in estrus. The visual method of detecting heat is wholly dependent on these homosexual tendencies of the female in estrus and by other "sympathetic females" not in estrus. Moreoever, animals when in heat become more active and nervous. They have brighter eyes, are restless and may sometimes bellow. Often a female may walk in search of a bull. Another sign that a female cow is in heat is that the visual genital organ, the vulva, becomes somewhat swollen and excretes a clear discharge. Additionally, cows that have recently been ridden show suggestive marks. For example, the hair over the tail head is disturbed and raised. Moreover, the fore feet of the riding animal may leave marks on the sides and shoulders of the ridden female. Further, if "teaser" animals are fitted with a "chin ball" a marker containing a dye, this dye will be deposited along the spinal chord of the animal ridden as the "teaser" uses the strength of its neck and chin to mount the cow in estrus.

When estrus occurs, the cow will show an increased tendency to stand and permit herself to be mounted by other animals as hereinabove stated. When the mounted animal allows the mounting animal to remain for about five to eight seconds, a "standing heat" has occurred. The most frequent mountings occur by bulls or "teaser" animals. Accordingly, the repeated mountings of a cow by an animal of either sex and for a time interval regarding each mount of about five to eight seconds is a good indication that the frequently mounted cow is in peak estrus or in "standing heat". The normal estrous period usually lasts from about twelve to eighteen hours, with peak estrus being about six hours.

The above-identified visual inspection and observation techniques of the herd require constant observation of the herd to determine whether an animal is in heat. Such visual observation must be conducted frequently and must be accompanied by immediate identification and/or segregation of the animal in heat if it is to be artificially inseminated. Also, unless the herd is maintained under constant visual observation, estrus may go undetected in many animals that never "peak" but maintain a low but constant level of estrus for a number of hours, and such low level estrus can only be detected by a bull or "teaser" animal. Visual observation of the herd is further made difficult, since many animals are nocturnal, particularly cattle, and their increased night sexual activity goes undetected. Most experts agree that approximately 68% of estrus in cattle occur after 6:00 p.m. and before 6:00 a.m. with 43% occurring between midnight and 6:00 a.m. Therefore, unless 24-hour visual observation of the herd is maintained by dedicated personnel, heat detection is inaccurate, inefficient, and depends largely on the ability and experience of the herdsmen, which usually is lacking. If the herdsman is not skilled in observing these visual signs, he can easily miss the occurrence of heat. Further, inclement weather may deter his observation regardless of his dedication and ability. These problems make it difficult to optimize breeding of the herd annually so that the offspring are born within the same "time window", mature at approximately the same time, and are ready for market or to be bred themselves at a common time.

Various devices and systems have been used or described for improving the efficiency of the detection of estrus. A commonly used device is a marking device such as identified in U.S. Pat. No. 1,237,983 issued to Werner on Aug. 21, 1917, and entitled "Marking Device." Other such marking devices utilize a tube or capsule mounted on the tail head of the cow. The tube contains a suitably colored dye. When the cow is ridden, the tube or capsule breaks and the dye is spread over the tail head of the cow. Such devices are passive in nature and are activated by pressure from the brisket of the mounting animal. While such devices have been somewhat satisfactory, these devices still require observation by the herdsmen. Moreover, careful visual observation is necessary in order to determine if the dye mark is fresh or old. Further, the presence of the dye mark merely indicates that a mounting has taken place. The mere fact that a mounting has taken place does not provide a true indication of whether the animal is in estrus, because standing heat requires that the mounting has occurred for about five to eight seconds and mountings have generally been repeated many times. Some cows in intense heat permit themselves to be ridden up to fifty times in a twelve to eighteen hour period. Other cows permit rides only a few times and of short duration.

U.S. Pat. No. 4,239,018 issued to Griffin, et al. on Dec. 16, 1980, and entitled "Heat Detector for Livestock" discloses the use of a delayed release pressure sensitive device for releasing a dye only after sustained pressure from the mounting animal has been achieved to minimize false triggering associated with prior passive marking devices. However, the Griffin, et al. device is also dependent on visual observation.

An additional detection apparatus is described in U.S. Pat. No. 3,297,020 issued to Mathiesen on Jan. 10, 1967, and entitled "Apparatus for Detecting Estrus in Animals." The Mathiesen device describes the use of a vaginally inserted electric probe for detecting accelerated mucous secretion accompanying the onset of heat. A visual indicator is utilized with the Mathiesen device and does not overcome the deficiencies previously mentioned. Further, the insertion of a foreign object into the vulva of a female animal fosters disease and infection.

U.S. Pat. No. 3,844,273 issued to Polson on Oct. 29, 1974, and entitled "Method and Apparatus for Animal Heat Detection and Recording" further discloses an additional system for the detection of heat in animals. The Polson system discloses an electronic system comprising a radio transmitter individually mounted on the female animals. The transmitter includes switches which are activated by the mounting animal. Again, as in those devices utilizing marking systems, the Polson apparatus merely indicates that an animal has been mounted but provides no indication of the duration or frequency of mounts and, therefore, no indication of whether the mounted animal was in standing (peak) heat.

U.S. Pat. No. 4,206,766 issued to Bielka on June 10, 1980, and entitled "Apparatus for Detecting Animal Estrus" utilizes a pressure responsive device connected to an indicating device to indicate the presence of estrus in an animal. A predetermined pressure must be exerted on the pressure-responsive device prior to release of the device in order to prevent spurious releases of the indicating device caused by pressures which are less than those occurring during an actual mounting, such as those caused by a second animal resting its head on the pressure responsive device. Even though spurious releases may be prevented by the Bielka apparatus, a false indication of heat may be indicated if sufficient pressure is available such as rubbing against a tree limb.

A need thus exists for an apparatus for determining when an animal is in estrus which provides a reliable indication of standing heat. Such a system must provide an indication that the female has been mounted and the duration and frequency of the mountings to provide a true indication of whether the animal is in estrus and the exact time of peak estrus. Such a system, to ensure reliable and accurate measurements must not rely upon a visual indication of the condition of the animal, since such visual observations have shown to be unreliable and difficult to routinely accomplish.

Although the present invention has application for determining when an animal is in estrus, the present system can also be utilized for other aspects of herd management including the administering of medical treatment and the dispensing of feed. Therefore, as will subsequently be described, the present invention also provides for other herd management functions.

DISCLOSURE OF THE INVENTION

In accordance with the present invention, a herd management system is provided for determining when an animal is in estrus in addition to providing for the monitoring of medical treatment and dispensing of feed.

In accordance with one aspect of the present invention, a system for detecting standing heat of a first animal is provided. A generator device is adapted to be secured to the body of the first animal for generating an identification signal uniquely identifying the first animal and for generating a time of day signal. A sensor device is adapted to be secured to the body of a second animal, usually a "teaser" (gomer) bull. The sensor device receives the signals generated by the generator as the second animal mounts the first animal and receives the signals generated by the generator as the second animal dismounts the first animal. The sensor further includes a transmitter for transmitting the signals received from the generator. A processor is further provided for receiving the sensor device transmitted signals for determining the length of time the second animal was in mounting contact with the first animal and for identifying the first animal. The processor can be programmed to screen out all mountings, for example, of less than three seconds or less than five seconds at the perogative of the programmer.

In accordance with another aspect of the present invention, a method of detecting standing heat of a first animal is provided. The method includes the step of providing the first animal with a signal generator for generating a unique identification signal and a time of day signal. A second animal is provided with a sensor for receiving the signals generated by the signal generator. The second animal is permitted to mount the first animal so that the sensor receives the signals generated by the signal generator at a first time period. The second animal is then permitted to dismount the first animal so that the sensor receives the signals generated by the signal generator at a second time period. The signals are transmitted by the sensor to a processor. The processor determines the duration of the mount by the second animal on the first animal.

In accordance with another aspect of the present invention, an animal feed dispenser is provided. A generator is adapted to be secured to the body of an animal for generating an identification signal representing dietary parameters of the animal. A sensor is mounted adjacent the food dispenser for receiving the signals generated by the generator and for transmitting the received signals. A processor is provided for receiving the signals transmitted by the sensor for controlling the operation of the feed dispenser.

Another and important aspect of the present invention is in "working" large numbers of cattle or animals whereby each animal is required to pass through a chute, and the animal's identifying mark (brand or ear tag) is read by one herdsman and orally called to a second herdsman to be recorded. Such visual and oral methods of identification invite errors in the health records of animals because of mis-identification. Many times brands are not clearly readable due to foreign matter deposited on them, and the loss of ear tag identification is quite common.

BRIEF DESCRIPTION OF THE DRAWINGS

The present invention can be more completely understood by reference to the following Detailed Description taken in conjunction with the accompanying Drawings in which.

DETAILED DESCRIPTION

Figure 1:
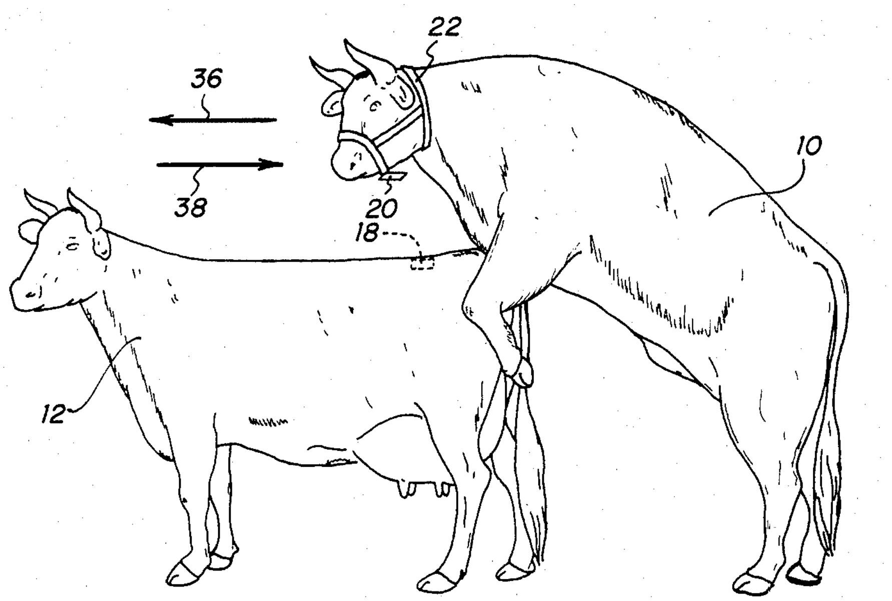
FIG. 1 is a pictorial diagram of a bull in standing mount of a cow illustrating one aspect of the present invention.

Referring to FIG. 1, a bull 10 is shown mounting a cow 12. Bull 10 may comprise, for example, a bull, a "teaser" or "gomer" bull or a "teaser" female. Should bull 10 "ride" cow 12 for approximately five to ten seconds, and there are repeated rides of this length of time there is a true indication that cow 12 is in peak estrus. Although FIG. 1 illustrates the use of the present invention for detecting whether cow 12 is in heat, a cow is used as an example, it being understood that the present invention may be easily adapted to be used to detect estrus in other animals such as, for example, horses, sheep, and goats.

Figure 4:
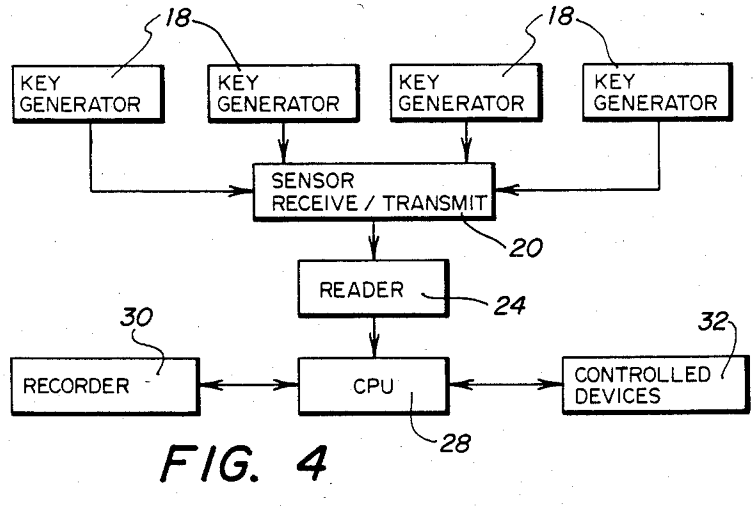
FIG. 4 is a block diagram of the present herd management system.

In order to detect the mounting and dismounting of cow 12 by bull 10, the present invention comprises an electronic detection system which automatically senses the presence of bull 10 in the riding position on cow 12. Referring simultaneously to FIGS. 1 and 4, the present invention includes a key generator 18. Key generator 18 comprises a small credit-card size card which is implanted under the skin of cow 12 in the rump area and slightly to one side of the spinal column. Key generator 18 is enclosed in inert plastic and includes electronic circuitry for generating a unique code and identification number associated with each cow 12 of a herd. Key generator 18 further includes circuitry for generating a real time clock signal indicating the time of day. Key generator 18 may be powered by solar rays or the body heat of cow 12.

The output of key generator 18 representing a unique code to identify cow 12 and the time of day is detected by a sensor 20 carried by bull 10 on harness 22. Sensor 20 includes a transmit-receive antenna which detects the unique code information generated by key generator 18 and transmits this detected information to a reader 24 (FIG. 4). Sensor 20 also generates a unique code to identify bull 10. Sensor 20 may be battery powered or solar powered.

Reader 24 reads the unique code associated with cow 12, the time of day transmitted by key generator 18 via sensor 20 and the identification of bull 10 and transmits this information to a central processing unit 28 for compilation of the information read by reader 24 for storage on a recorder 30. The output of central processing unit 28 may also be applied to controlled devices 32 which will subsequently be described with respect to FIG. 2.

In operation of the present invention, when a cow 12 of the herd is approaching estrus, bull 10 will naturally sense this condition and will mount cow 12 from the rear in the direction of arrow 36 as illustrated in FIG. 1. As sensor 20 passes in the vicinity of key generator 18 as bull 10 moves in the direction of arrow 36 as bull 10 mounts cow 12, sensor 20 receives the unique identification code of cow 12 and the time of day. This information is then transmitted by sensor 20 to reader 24 for subsequent processing by central processing unit 28 and recorder 30.

As bull 10 removes himself from cow 12 in the direction of arrow 38 or should cow 12 run from under bull 10, sensor 20 will again pass within the vicinity of key generator 18 and again read the information generated by key generator 18 which, at this second reading will indicate a later time of day. The time interval between the first sensing of key generator 18 and the second sensing of key generator 18 will indicate the duration bull 10 has ridden cow 12. If cow 12 is in false heat, she will immediately run from under bull 10, and the time interval of the ride will be short. On the other hand, if cow 12 is in peak estrus, she will permit bull 10 to remain mounted for approximately five to ten seconds.

The recorded information recorded on recorder 30 will provide a list of all cows 12 of the herd mounted by all bulls 10 on a particular day with the time interval of each ride so that peak estrus can be determined precisely on a daily basis, therefore, establishing the natural heat cycle (estrous cycle) which usually occurs every 18–21 days in cattle. The next predictable heat date is very important in synchronizing donor and recipient cattle.

Key generator 18, sensor 20 and reader 24 are manufactured and sold by Schlage Electronics of Santa Clara, Calif. Key generators 18 are sold as Model 1030; sensor 20 is sold as Models 2710, 2711, 2714 and 2715; and reader 24 is sold as Model 708P. A complete description of the operation of these components is found in "Model 708P Users Manual" published by Schlage Electronics as Part Number 66103305, Revision E, which is hereby incorporated by reference. It therefore can be seen that the present system provides for an accurate measurement of the length of time a cow is ridden by a bull or a "teaser" animal which is a true measure of whether a cow is in estrus and is, therefore, essential in establishing her natural heat cycle predicting her next heat date. The present system overcomes the disadvantages or previously developed estrous detecting devices in that false indications associated with pressure sensing devices are eliminated as well as all visual observations of the herd.

Figure 2:
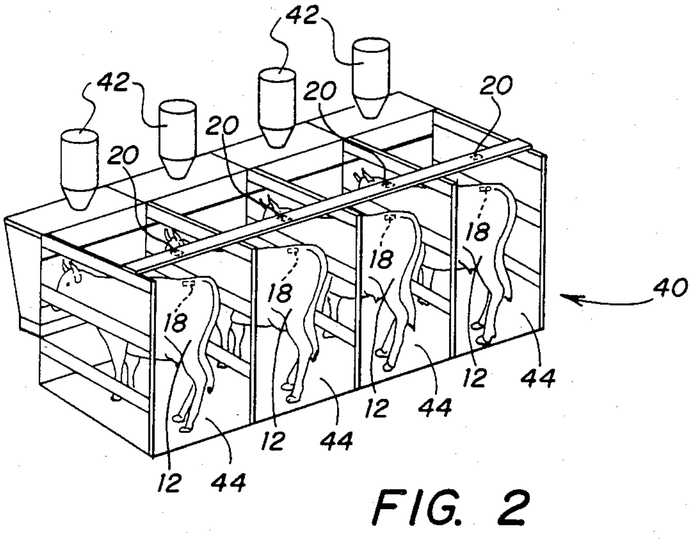
FIG. 2 is a pictorial diagram of a feed lot illustrating an additional aspect of the present invention.

An additional embodiment of the present invention is illustrated in FIG. 2 representing a cattle feed dispensing facility, generally identified by the numeral 40 and having a plurality of feed dispensing stations 42 and stalls 44. Associated with each stall 44 is a sensor 20 as previously described. Each cow 12 also utilizes a key generator 18 which may be either implanted as illustrated in FIG. 1 or mounted to a harness around each cow 12.

In this embodiment of the present invention, each key generator 18 is encoded with various parameters reflecting the physical condition of a cow 12 such as, for example, weight, pregnancy condition, vitamin deficiency and medication needs. As each cow 12 enters a stall 44, sensor 20 will receive and transmit the information from key generator 18 identifying a particular cow 12 and its physical conditions to reader 24 (FIG. 4). Central processing unit 28 will then provide the necessary control information to controlled devices 32 (FIG. 4) which in the present example are feed dispensers 42 to control the amount of feed dispensed to a particular cow 12 as well as any needed vitamins and medication. In this manner, the present invention provides for the automatic control of a feed dispensing unit to dispense the required amounts of food as well as medication to a cow of the herd based upon the individual needs of each cow.

Figure 3:
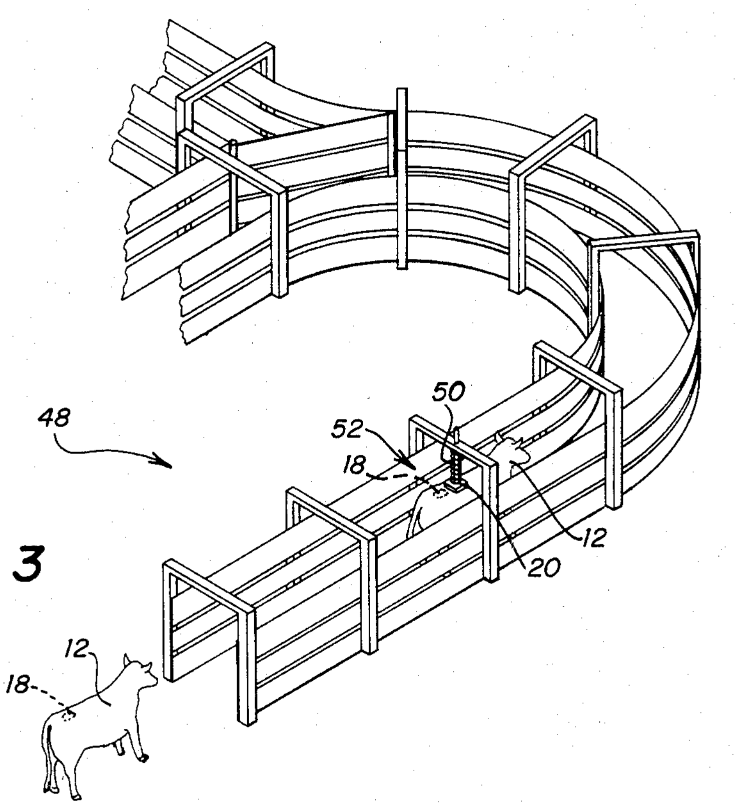
FIG. 3 is a pictorial diagram of a working chute area illustrating a further aspect of the present invention.

Referring to FIG. 3, a working chute, generally identified by the numeral 48, is illustrated in which a sensor 20 is spring mounted utilizing a spring 50 above a chute 52. Spring 50 permits sensor 20 to adjust to the height of cows 12 entering working chute 48. If a number of cows 12 are to be worked during a day such as, for example, the administering of medical treatment, parasite control or brucellosis shots, each cow 12 passes through working chute 52. Sensor 20 will automatically read the unique identification code of each cow 12 as key generators 18 pass within the area of sensor 20. The identification number will then be transmitted by sensor 20 to reader 24 and central processing unit 28 (FIG. 4). In this manner, an automatic record can be compiled indicating which animals of the herd have been worked during a particular day and what medical or routine services were provided, and this information can quickly be entered on each individual cow's health record by the processor. Central processing unit 28 can then maintain a health record for each animal of the herd as part of the herd management program.

It therefore can be seen that the present invention provides for several aspects of animal herd management including determining whether an animal is in heat, feed dispensing and inventory control type functions. The present system functions without the need for visual observation of the herdsmen and operates maintenance free.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A system for detecting standing heat of a first animal comprising:

generator means adapted to be implanted in the body of the first animal for generating an identification signal uniquely identifying the first animal and for generating time of day signals;

sensor means adapted to be secured to the body of a second animal for receiving said identification signal and a first time of day signal generated by said generator means as the second animal mounts the first animal and for receiving said identification signal and a second time of day signal, subsequent to said first time of day signal generated by said generator means as the second animal dismounts the first animal in which no contact occurs between said generator means and said sensor means;

said sensor means further including means for transmitting said signals received from said generator means and for transmitting a unique identification signal associated with the second animal;

processing means for receiving said sensor means transmitted signals and for determining the difference between said second time of day signal and said first time of day signal thereby determining the length of time the second animal was in mounting contact with the first animal and for identifying the first animal; and means interconnected to said processing means for recording the length of time the second animal was in mounting contact with the first animal determined by said processing means and for recording the identity of the first and second animals.

* * * * *